Figure 1:
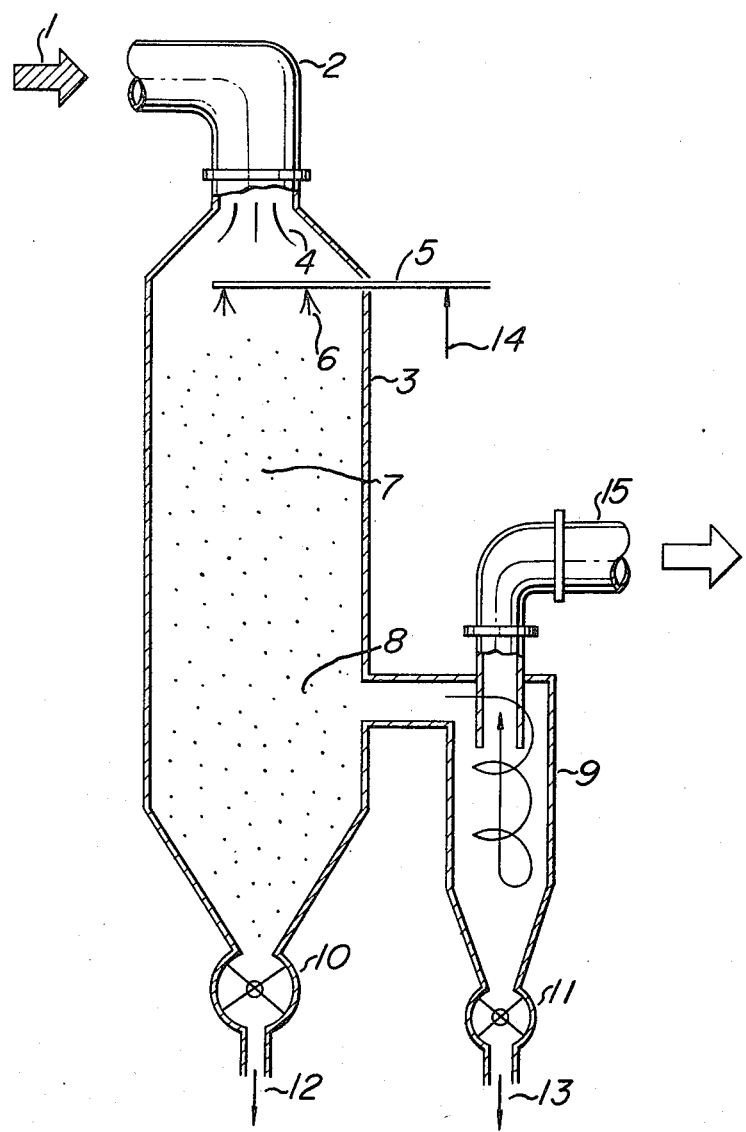

United States Patent [19]

Isahaya et al.

[11] 4,293,521
[45] Oct. 6, 1981

[54] APPARATUS FOR CLEANING WASTE FLUE GASES

[75] Inventors: Fumio Isahaya, Hitachi; Tugihiro Yukitake, Ibaraki, both of Japan

[73] Assignee: Hitachi, Ltd., Tokyo, Japan

[21] Appl. No.: 103,572

[22] Filed: Dec. 14, 1979

Related U.S. Application Data

[60] Division of Ser. No. 801,328, May 27, 1977, Pat. No. 4,208,381, which is a continuation of Ser. No. 197,356, Nov. 10, 1971, abandoned.

[30] Foreign Application Priority Data

Dec. 4, 1970 [JP] Japan ................. 45/107811

[51] Int. Cl.$^3$ .............. G01N 25/56; G01N 25/66; B01D 53/54
[52] U.S. Cl. ................. 422/62; 23/230 A; 422/105; 422/111; 423/235; 423/242; 423/DIG. 5
[58] Field of Search ............... 423/210, 234, 235, 240, 423/241, 242, 215.5, DIG. 5; 23/230 A; 422/62, 105, 111; 364/500, 497, 502

[56] References Cited

U.S. PATENT DOCUMENTS 2,021,936 11/1935 Johnstone ..................... 423/242
2,231,309 2/1941 Weber ....................... 423/242 X Primary Examiner—Ronald Serwin
Attorney, Agent, or Firm—Craig and Antonelli

[57] ABSTRACT

A waste flue gas cleaning method and an apparatus for practicing said method, in which a reactant solution is sprayed into a waste flue gas introduced into a spray tower, whereby a toxic component in the flue gas is caused to be absorbed in and react with the droplets of the sprayed reactant solution, and the water contained in the droplets is vaporized and the reaction products are dried into solid particles by the sensible heat of said flue gas. A series of the above operation is accomplished within the spray tower while maintaining the outlet gas temperature always above the dew point of the flue gas, and the solid particles of the reaction products are removed from the flue gas by an after dust collector.

13 Claims, 2 Drawing Figures

APPARATUS FOR CLEANING WASTE FLUE GASES

This is a division of pending application Ser. No. 801,328, filed May 27, 1977, now U.S. Pat. No. 4,208,381 which application is a continuation of application Ser. No. 197,376 filed Nov. 10, 1971, now abandoned.

This invention relates to a method of and an apparatus for cleaning waste flue gases by removing therefrom toxic gases such as $SO_2$, $NO_2$, NO, $H_2S$, HF, F. etc.

The object of the present invention is to provide a waste flue gas cleaning method which can be practiced by a highly economical, very simple apparatus, i.e. a method which comprises the steps of spraying a reactant solution in the form of a fine mist into a hot waste flue gas, causing the toxic components contained in said waste flue gas to be absorbed by and react with said reactant solution, drying the water present in the droplets of said reactant solution by the sensible heat of the waste flue gas and collecting the reaction products in the form of solid particles, a series of said steps of operation continuously being carried out within a single spray drying tower in a short period of time in a manner to prevent a temperature lowering and humidity increase of the waste flue gas caused by the vaporization of the water contained in the sprayed reactant solution and constantly maintaining the humidity of the flue gas released into the atmosphere above the dew point thereof, thereby to prevent the atmospheric pollution otherwise caused by the flue gas.

According to the present invention it is also possible to prevent secondary public nuisance caused by a large amount of waste water discharged from apparatus by which conventional wet-type methods are practiced. Further, according to the invention it is possible, in recovering valuable substances from the waste water, to omit a condensing or extracting operation, which is highly advantageous from the standpoint of economy.

The present invention will be described in detail hereunder with reference to the accompanying drawings. In the drawings, FIG. 1 is a schematic view illustrating the waste flue gas cleaning method according to the present invention; and FIG. 2 is a system diagram showing an embodiment of the apparatus according to the invention.

Figure 2:
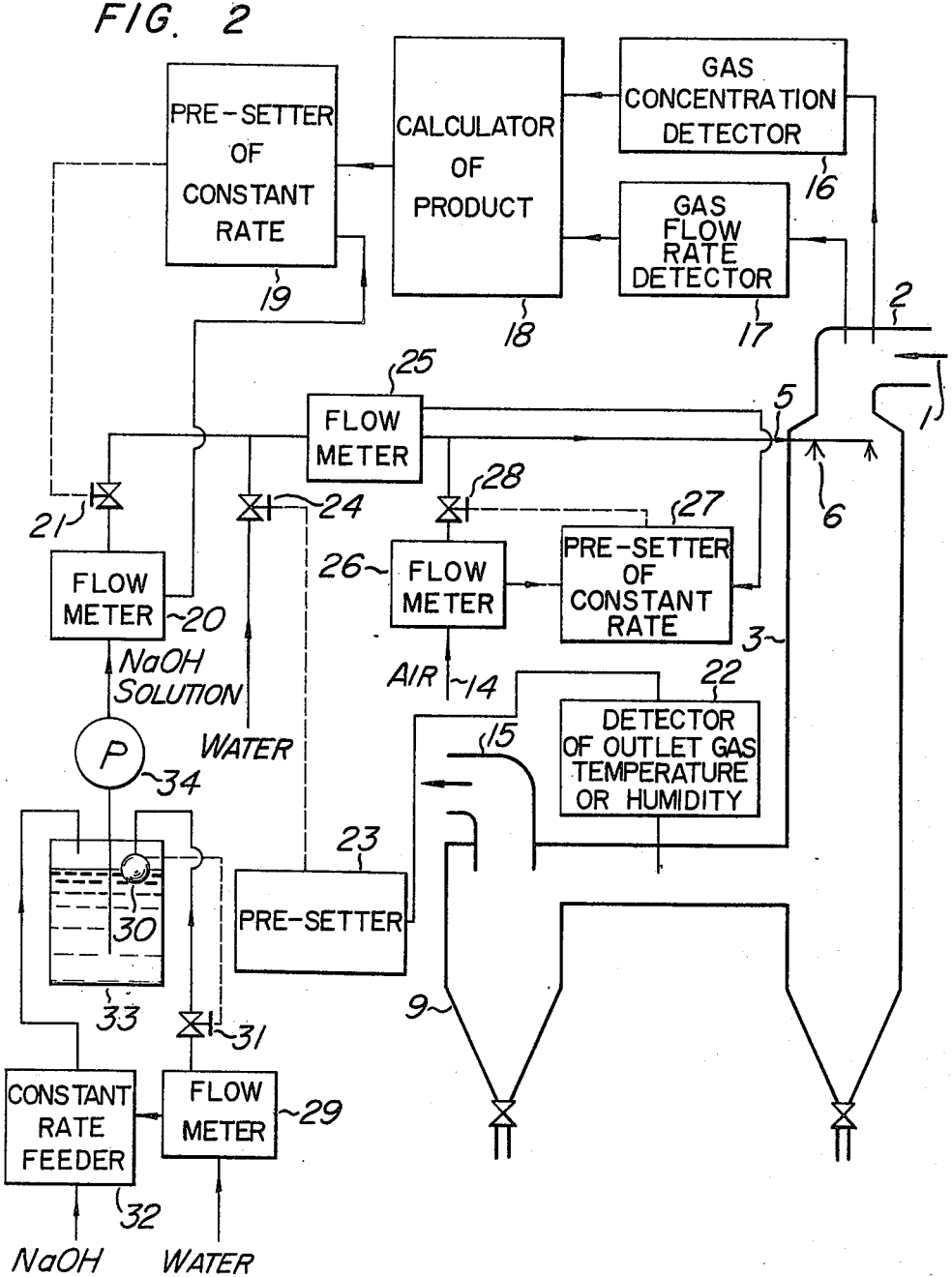

Referring first to FIG. 1 there are shown the principle of the waste flue gas cleaning method of the invention and the construction of an apparatus for practicing said method.

A contaminated waste flue gas 1 is introduced into an absorbing and vaporizing tower 3 through an inlet duct 2. On the other hand, a reactant solution consisting, for example, of an aqueous caustic soda solution of a consistency of about 10% supplied through a duct 5 along with compressed air 14 is sprayed from nozzles 6 into the waste flue gas in the tower 3.

When the waste flue gas is introduced into the sprayed mist zone via guide vanes 4, toxic components contained therein contact the droplets of the sprayed solution and are absorbed thereby. In the droplets, the following reactions take place:

Sulfur dioxide:

$$2NaOH + SO_2 \rightarrow Na_2SO_3 + H_2O \quad (1)$$

$$Na_2SO_3 + \tfrac{1}{2}O_2 \rightarrow Na_2SO_4 \quad (2)$$

$$Na_2SO_3 + SO_2 + H_2O \rightarrow 2NaHSO_3 \quad (3)$$

$$2NaHSO_3 + O_2 \rightarrow 2NaHSO_4 \quad (4)$$

$$Na_2CO_3 + SO_2 \rightarrow Na_2SO_3 + CO_2 \quad (5)$$

Nitrogen oxides:

$$Na_2SO_3 + \tfrac{1}{3}NO_2 \rightarrow Na_2SO_4 + \tfrac{1}{3}N_2 \quad (6)$$

$$2NaOH + NO_2 \rightarrow Na_2NO_3 + H_2O \quad (7)$$

$$2NaOH + NO + NO_2 \rightarrow 2NaNO_2 + H_2O \quad (8)$$

Hydrogen sulfide:

$$NaOH + H_2S \rightarrow NaHS + H_2O \quad (9)$$

$$NaHS + NaOH \rightarrow Na_2S + H_2O \quad (10)$$

Fluorine and hydrogen fluoride:

$$NaOH + HF \rightarrow NaF + H_2O \quad (11)$$

$$2NaOH + F_2 \rightarrow 2NaF + \tfrac{1}{2}O_2 + H_2O \quad (12)$$

The droplets of the reactant solution having the toxic components absorbed and dissolved therein as a result of the above reactions fall in a zone 7 within the tower 3 while being suspended in the waste flue gas, and in this case the water of the droplets is quickly vaporized by the sensible heat of the waste flue gas. The time required for the vaporization of water is within a few seconds.

In the vicinity of a zone 8 disposed downstream of the tower 3, the reaction products are formed into solid particles. These solid particles are separated and collected by an after dust separator 9, such as cyclone, electrostatic precipitator or bag filter while the cleaned flue gas is discharged through an outlet duct 15.

The solid particles of the reaction products collected in the after dust separator 9 are discharged to the outside from a discharge duct 13 via discharge means 11 such as a rotary valve or dual air-lock damper, and reused as such as a valuable substance, or regenerated into caustic soda and other valuable substances. The caustic soda thus produced can be recycled through the apparatus for use.

A part of the solid particles of the reaction products formed in the tower 3 through the steps of absorption, reaction and vaporization is discharged from the bottom of the tower to the outside through a discharge duct 12 via discharge means 10.

As may be understood from the foregoing description, the present invention consists in a waste flue gas cleaning method which comprises spraying a reactant solution in the form of a fine mist into a waste flue gas introduced into a tower, causing toxic components in the waste flue gas to be absorbed by and react with the mist of the reactant solution, completely drying the reaction products into solid particles within the tower by the sensible heat of the waste flue gas, and separating and collecting the solid particles of the reaction products.

In practicing the method of this invention, the temperature of the waste flue gas lowers and the humidity thereof increases incident to the vaporization of the water contained in the sprayed solution, with the result that the cleaning efficiency is degraded. In order to achieve satisfactory cleaning, it will be effective to control the amount of water contained in the sprayed reactant solution and the amount of said reactant solution so as to maintain the temperature of the waste flue gas discharged from the apparatus above the dew point thereof.

A practical arrangement to achieve this will be described with reference to an embodiment of the apparatus of the invention shown in FIG. 2. The concentration of a toxic gas (e.g. $SO_2$) is detected by a gas concentration detector 16 and converted into an electric signal, and the flow rate of the waste flue gas is detected by a gas flow rate detector 17 and converted into an electric signal. The electric signals generated by the gas concentration detector 16 and the gas flow rate detector 17 are supplied to a calculator, which in turn generates an electric signal proportional to the product of said two electric signals. The flow rate of the reactant solution (e.g. a caustic soda solution) of a predetermined concentration is measured by a flow meter 20 and converted into an electric signal. The electric signals from the flow meter 20 and the calculator 18 are supplied to a constant rate presetter 19, in which the ratio of said electric signals is compared with a preset value, and said constant rate presetter 19 generates an electric signal representative of the balance of the value of said ratio and said preset value. A control valve 21 is actuated in response to the electric signal from the constant rate presetter 19 to regulate the flow rate of the reactant solution, so that the said reactant solution will be supplied in an amount equivalent to the amount of the toxic gas. Thus, the reactant solution can be supplied at a predetermined ratio according to the varying amount of the flue gas and concentration of the toxic gas at the inlet duct 2 of the tower 3, but the temperature of the outlet gas fluctuates. In order to maintain the outlet gas temperature constantly above the dew point thereof, the outlet gas temperature or humidity is detected by a detector 22 and converted into an electric signal. The electric signal from the outlet gas temperature or humidity detector 22 is supplied to a presetter 23 in which it is compared with a preset temperature or humidity value, and said presetter 23 generates an electric signal representative of the balance of said two values. A control valve 24 is actuated by the electric signal from the presetter 23, to regulate the flow rate of water to be mixed with the reactant solution. The flow rate of the reactant solution whose consistency has thus been adjusted is detected by a flow meter 25 and converted into an electric signal, while the flow rate of compressed air for spraying the reactant solution is detected by a flow meter 26 and converted into an electric signal. The electric signals from the flow meters 25, 26 are supplied to a presetter 27, in which the ratio of said electric signals is compared with a preset value, and an electric signal representative of the balance of said two values is generated by said presetter 27. A control valve 28 is actuated in response to the electric signal from the presetter 27 to regulate the flow rate of air, so that a preset ratio of air to the reactant solution may be supplied.

The material solution of the reactant solution to be sprayed is supplied from a tank 33 by means of a pump 34. In order to maintain the concentration of the material solution at a predetermined level, there are provided a flow meter 29 for measuring the flow rate of water and a constant rate feeder 32 for metering and feeding a reactant (e.g. caustic soda) into the tank 33 at a rate proportional to the flow rate of water. When the reactant solution has reached a predetermined level in the tank 33, the level of the reactant solution is detected by a liquid level detector 30 disposed in said tank, and a valve 31 is closed in response to a signal from said level detector 30.

In the manner described above, the absorption, reaction, vaporization and drying of the toxic components are continuously carried out in a single and the same spray tower, and the reaction products are collected in the form of solid particles, while maintaining the outlet gas temperature always above the dew point thereof, even when the inlet gas temperature, the amount of the waste flue gas and the concentrations of the toxic components fluctuate.

Now, an example of the present invention will be illustrated hereunder, in which $SO_2$ contained in a waste flue gas was removed by the method of the invention.

| | |
|---|---|
| Temperature of the waste flue gas | about 150° C. |
| Water content in the waste flue gas | about 10% by volume |
| Concentration of $SO_2$ | about 1500 p.p.m. |
| Concentration of aqueous caustic soda solution sprayed | about 11.5% |
| Amount of the solution sprayed | 0.03 l/m³ of gas |

The method of the present invention was practiced under the conditions set forth above. The desulfurization degree was about 80%; the gas temperature at the outlet opening of the cyclone separator was about 105° C. (the dew point was about 55° C.); and the pressure loss was about 50 mmH$_2$O. The reaction products were collected as solid particles of $Na_2SO_3$ and $Na_2SO_4$ from the bottom of the absorbing and vaporizing tower and the cyclone separator.

The cyclone separator used in the embodiment of the present invention may be combined with or substituted by a bag filter or electrostatic precipitator.

Besides caustic soda, other alkaline reactant solutions and slurry of calcium hydroxide may be selectively used depending upon the type and characteristic of the toxic gas desired to be removed. In operating the apparatus of the invention, it is also effective to heat the wall of the absorbing and vaporizing tower.

In summary, the apparatus of the present invention comprises an absorbing and vaporizing tower having an inlet and an outlet for a waste flue gas and equipped with spray means for spraying a reactant solution in an atomized state into the waste flue gas introduced into said tower, detectors for detecting the flow rate of the inlet gas and the concentration of a toxic component contained in the waste flue gas at the inlet of the tower respectively, and means for supplying the reactant solution to said spray means after adjusting the ratio between water and the reactant, said reactant solution supplying means being operative in response to signals from said detectors and a gas temperature or humidity detector provided at the outlet of said tower so that the reaction products produced within said tower may be formed into solid particles at a temperature above the dew point of the waste flue gas. The waste flue gas cleaning apparatus of the invention is advantageous over conventional dry methods such as an activate charcoal adsorption method, in that it can be operated with a pressure loss not greater than 100 mmH$_2$O and is substantially small in volume and simple in construction. Therefore, the apparatus is excellent also from the standpoint of economy.

Another advantage is that since the reaction products can be collected in the form of completely solidified particles, the cost of processing the waste water can be reduced. These solid particles can be effectively used as by-products.

What is claimed is:

1. A waste flue gas cleaning apparatus comprising a vaporizing tower having an inlet and an outlet for a waste flue gas and equipped with spray means for spraying a reactant solution in an atomized state into the waste flue gas introduced into said tower, detectors for detecting the flow rate of the inlet gas and the concentration of a toxic component contained in the waste flue gas at the inlet of the tower, respectively, and means for supplying the reactant solution to said spray means after adjusting the ratio between an amount of water, to be admixed with the reactant solution, and the reactant solution, said reactant solution supplying means being operative in response to signals from said detectors and to a signal from a gas temperature or humidity detector provided at the outlet of said tower whereby the reaction products produced within said tower are formed into solid particles at a temperature above the dew point of the waste flue gas.

2. The waste flue gas cleaning apparatus as defined in claim 1, wherein said reactant solution supplying means includes first means for regulating the flow rate of the reactant solution in response to signals from said detectors and second means for regulating the flow rate of water to be admixed with the reactant solution from said first means in response to a signal from said gas temperature or humidity detector.

3. The waste flue gas cleaning apparatus as defined in claim 1 or 2, further including means for supplying compressed air into said reactant solution supplying means according to the flow rate of said reactant solution.

4. An apparatus for cleaning waste flue gas, which comprises:
(1) a tower having an inlet through which the waste flue gas is introduced and an outlet for discharging treated flue gas from said tower,
(2) spray means provided in said tower for spraying a reactant solution into said flue gas to make the reactant solution react with a toxic component in said flue gas and to cause the heat retained in said flue gas and reaction heat to dry the reactant solution and the reaction products into solid particles,
(3) means for detecting an amount of toxic component in the waste flue gas introduced into said tower,
(4) means for controlling the amount of reactant solution to be sprayed, in response to the detected amount, and
(5) means for maintaining the temperature of the waste flue gas discharged from the tower above the dew point.

5. The apparatus of claim 4, wherein the reactant solution is an alkaline aqueous solution contained within a vessel connected to said spray means.

6. The apparatus of claim 4 or claim 5, wherein said reactant solution is sprayed together with compressed air into said tower.

7. The apparatus of claim 4 or claim 5, wherein the toxic component within said gas is sulfur dioxide and the reactant solution is an aqueous solution of sodium hydroxide.

8. The apparatus of claim 4, wherein said means for detecting an amount of toxic component in the waste flue gas comprises:
(a) means for detecting the flow rate of the flue gas introduced into the tower and for producing an electrical signal representing said flow rate,
(b) means for detecting the concentration of toxic component in said gas introduced into the tower and for producing an electrical signal representing said concentration, and
(c) means for calculating the amount of toxic component in response to the electrical signals from said means (a) and (b) and for outputting an electrical signal corresponding to the calculated amount.

9. The apparatus of claim 4 or claim 5, wherein said tower includes means for discharging a part of the dried particles separately from the waste flue gas that is discharged through the outlet.

10. The apparatus of claim 4 or claim 5, wherein said means for maintaining the temperature of the waste flue gas to be discharged into the atmosphere above the dew point comprises:
(d) means for detecting the temperature of the discharge gas and for producing an electrical signal representing the temperature, and
(e) means for controlling the amount of water to be admixed with the reactant solution prior to being introduced into the spray means, in response to the electrical signal obtained from means (d), thereby maintaining the temperature of the gas to be discharged into the atmosphere above the dew point.

11. The apparatus of claim 4, which further comprises:
(f) means for detecting the humidity of the discharge gas, and
(g) means for controlling the amount of water to be admixed with the reactant solution prior to being sprayed by said spray means in response to the detected humidity.

12. The apparatus of claim 5, wherein the alkaline solution is an aqueous solution of sodium hydroxide.

13. The apparatus of claim 10, wherein said means for maintaining the temperature of the waste flue gas to be discharged into the atmosphere above the dew point further comprises:
(h) means for detecting the flow rate of the reactant solution with which water has been admixed and for producing an electrical signal representing said flow rate,
(i) means for detecting the flow rate of compressed air introduced into the spray means and for producing an electrical signal representing the flow rate of said compressed air,
(j) means for comparing the electrical signals from means (h) and (i) with a preset value and for generating another electrical signal representative of the comparison, and
(k) means for regulating the flow rate of compressed air responsive to said another signal.

* * * * *